UNITED STATES PATENT OFFICE.

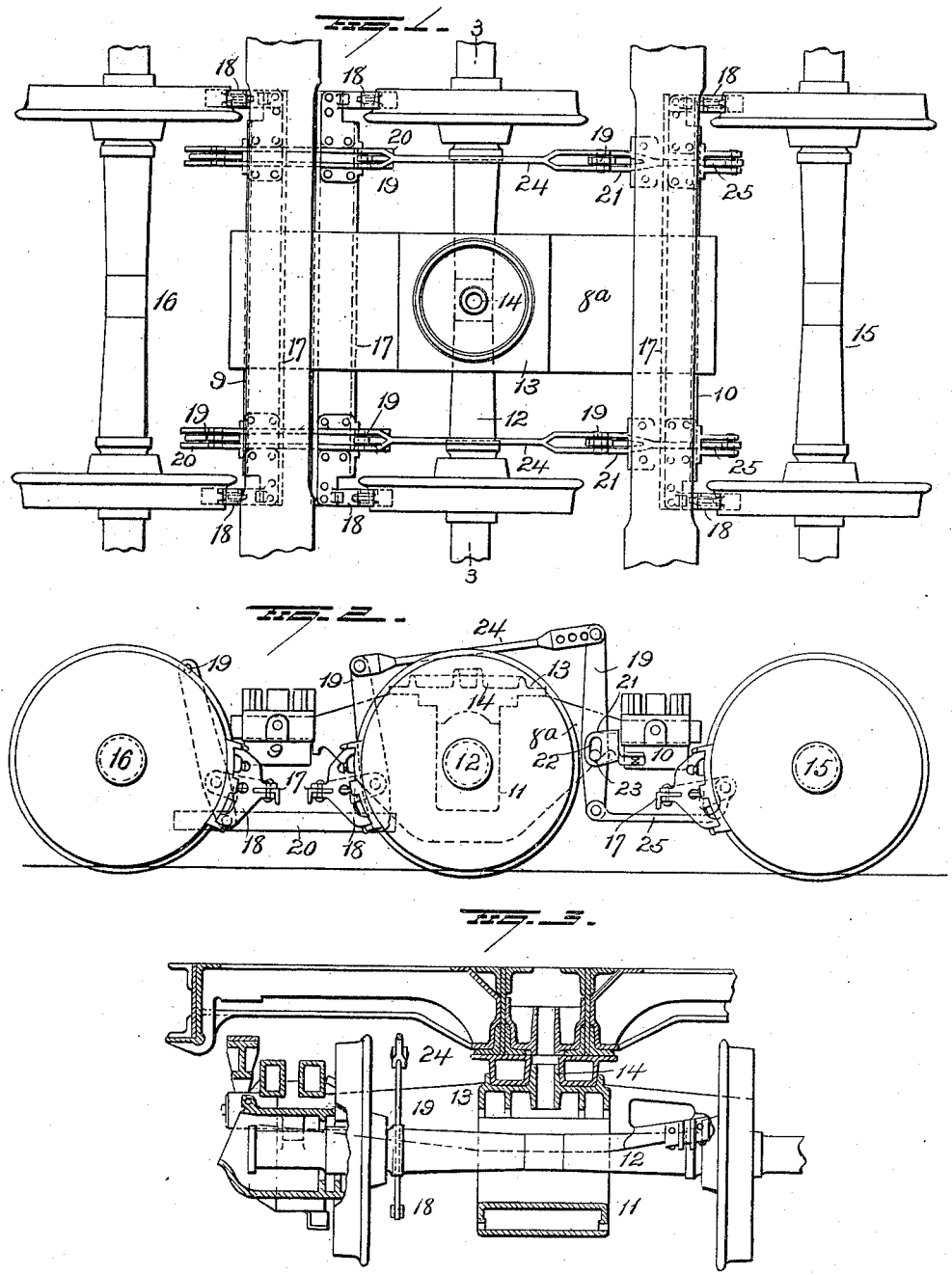

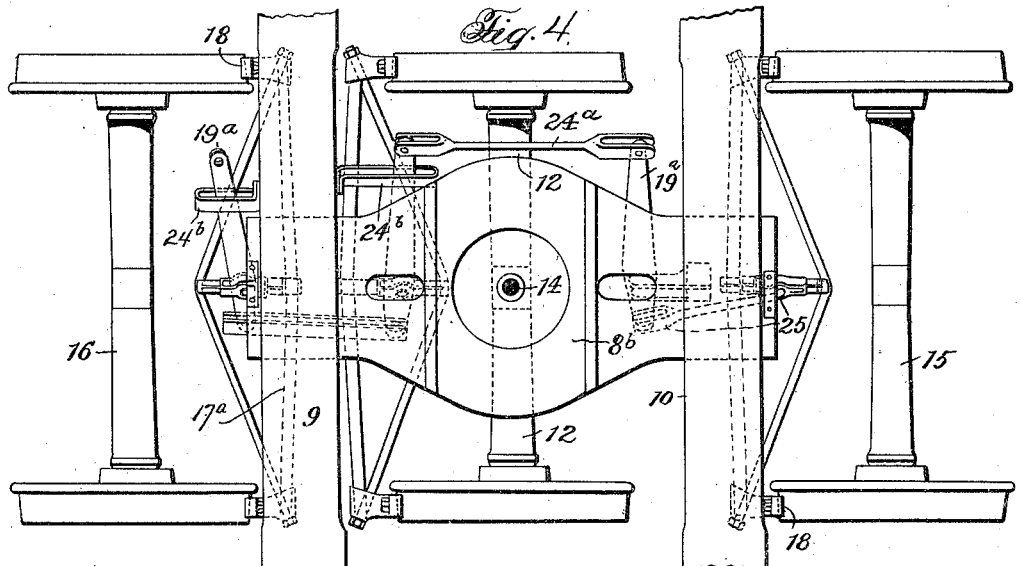
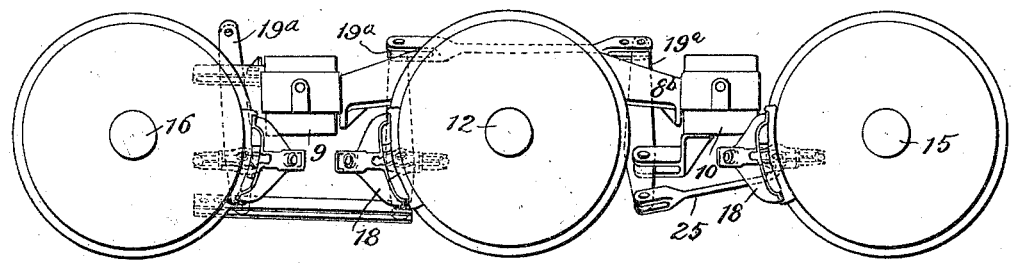
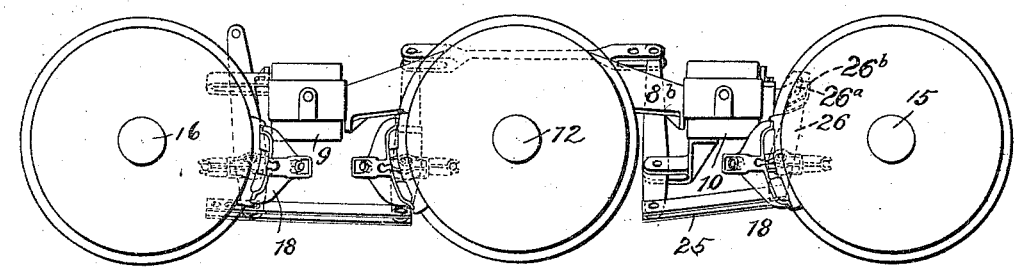

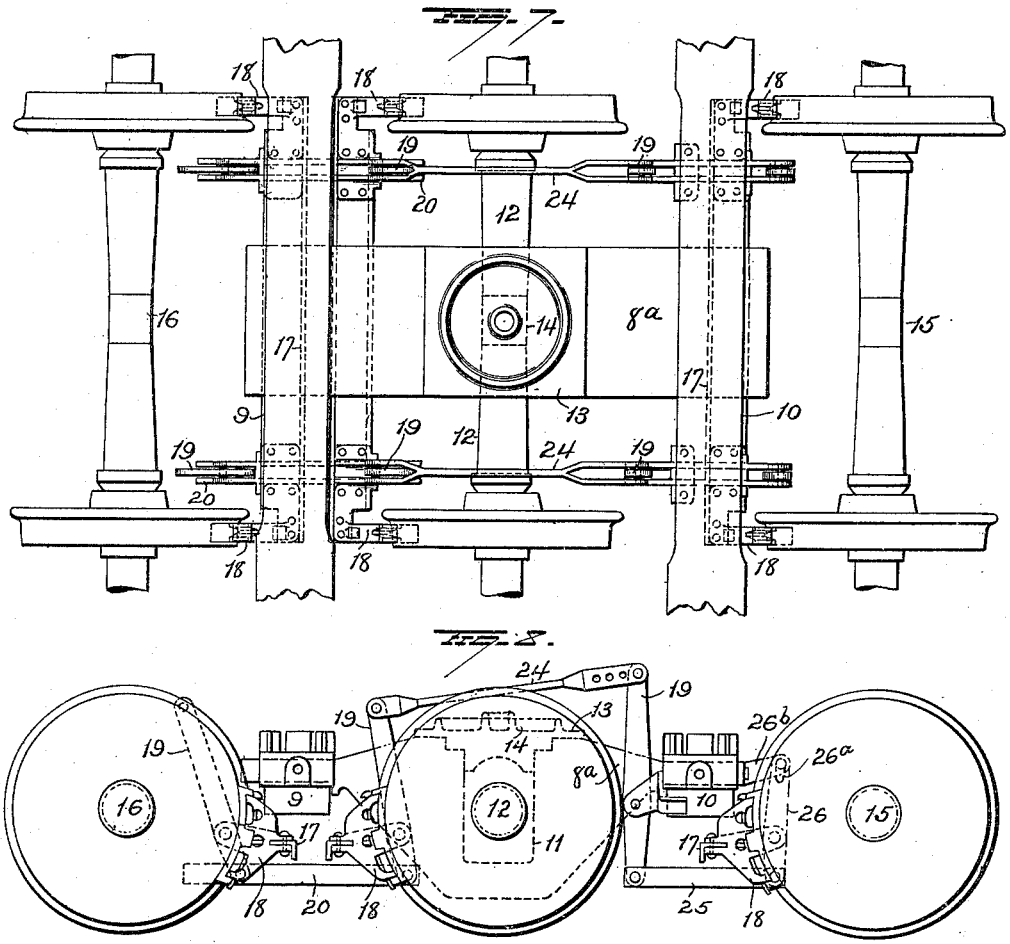

JOHN C. WHITRIDGE AND GEORGE T. JOHNSON, OF COLUMBUS, OHIO, ASSIGNORS TO THE BUCKEYE STEEL CASTINGS COMPANY, OF COLUMBUS, OHIO.

BRAKE ARRANGEMENT FOR SIX-WHEEL TRUCKS.

1,232,142. Specification of Letters Patent. Patented July 3, 1917.

Application filed April 21, 1916. Serial No. 92,638.

*To all whom it may concern:*

Be it known that we, JOHN C. WHITRIDGE and GEORGE T. JOHNSON, citizens of the United States and residents of Columbus, in the county of Franklin and State of Ohio, have invented certain new and useful Improvements in Brake Arrangements for Six-Wheel Trucks; and we do hereby declare the following to be a full, clear, and exact description of the invention, such as will enable others skilled in the art to which it appertains to make and use the same.

Our invention relates to improvements in brake arrangement for six wheel trucks, the object being to provide a construction that will be comparatively simple, and which will equalize the brake pressure on all wheels at the same time.

Our invention consists in the parts and combination of parts as will be more fully described and pointed out in the claims.

In the accompanying drawings, Figure 1 is a view in plan; Fig. 2 is a view in side elevation and Fig. 3 a view in section on the line 3—3 of Fig. 1, all of one form of brake mechanism; Figs. 4 and 5 are views in plan and side elevation of another form; Fig. 6 is a view in side elevation of another modification and Figs. 7 and 8 are views in plan and side elevation respectively of the arrangement shown in Fig. 6 with the levers arranged in pairs.

Referring to the drawings in which like parts are given the same reference number wherever they occur, $8^a$ representing the main bolster and extending lengthwise of the truck is mounted at its ends on seats formed in or on the auxiliary bolsters 9 and 10. These latter bolsters extend transversely of the truck, one being located in a plane between the axle 15 and the middle axle 12, and the other between the middle axle 12 and the axle 16.

The brake beams 17 are supported from the truck side frames and the brake shoes 18 are keyed to the brake beams in the usual manner.

In Figs. 1, 2 and 3 each brake beam 17 is shown actuated by two vertical levers which project to points above the top of the transverse bolsters and thus all connections between the levers and the chains or rods from the brake actuating mechanism, will be at opposite sides of the main bolster and in a plane above the auxiliary bolsters, leaving all of said parts readily accessible and clear of other truck parts.

The four levers 19 at opposite sides of auxiliary bolster 9, are arranged in pairs as shown in Fig. 1, and each pair is connected at their lower ends by the compression member 20, and at points intermediate their ends to the brake beams 17.

The remaining two levers 19 are located intermediate the auxiliary bolster 10 and middle axle 12 and are connected at their lower ends to the brake beam 17, by the compression members 25, as shown in Fig. 2, or if preferred, may be connected to the lower ends of levers, as 26 shown in Figs. 6, 7 and 8, the said levers being connected to the brake beam. The upper ends of the said levers 19 are connected by the tension members 24 with the intermediate floating levers 19.

With this construction it will be seen that when a pulling stress is exerted on the upper ends of the two levers at the outer side of bolster 9, the brake shoes of all three brake beams will be forced into contact with their respective wheels, and the entire equipment being flexible, the brake pressure on all the wheels will be the same by properly proportioning the various levers.

In the construction shown in Figs. 4 and 5 we have shown single levers $19^a$ connected to the longitudinal center of brake beams $17^a$, and disposed diagonally so that their upper ends are above and to one side of the main bolster $8^b$ which in this instance is shown wider at its center than the main bolster in Fig. 1.

We have shown looped guides $24^b$ for guiding and steadying the levers; and tension member $24^a$ connecting lever $19^a$ is at one side of main bolster $8^b$.

In the construction shown in Fig. 6 the compression member 25 is connected to the lever 26 instead of to the brake beam as in Fig. 5. This lever 26 is provided with an oblong slot $26^a$ through which a pin on bracket $26^b$ passes, so as to permit of a slight rise and fall of the brake shoes as the latter are applied to and released from braking engagement with the wheels.

In each of the above forms the brake mechanism is wholly outside of the main and above the auxiliary bolsters, and is consequently readily accessible for repairs or readjustments, and with any of the arrangements it is possible by properly proportioning the levers to equalize the brake pressure, or get the same brake pressure on all the wheels at the same time.

It is evident that many slight changes might be resorted to in the relative arrangement of parts shown and described without departing from the spirit and scope of our invention, hence we would have it understood that we do not wish to confine ourselves to the exact construction and arrangement of parts shown and described, but Having fully described our invention what we claim as new and desire to secure by Letters-Patent, is:—

1. In a brake rigging for six wheel trucks, the combination of a live lever, having a pivot point between its extremities, a brake beam pivotally connected to said fulcrum point, a compression member connecting the lower end of said lever with the lower end of a second lever, the latter having a pivot point between its extremities, a second brake beam pivotally connected to said fulcrum point, a tension member connecting the upper end of said lever with the upper end of a third lever, the latter being fulcrumed at a point between its extremities to some convenient part of the truck, and a compression member connecting the lower end of said lever with a third brake beam.

2. In a brake rigging for six wheel trucks, the combination of a pair of vertically disposed live levers, one on each side of the truck, each lever having a pivot point between its extremities, a brake beam connected to each lever at fulcrum points between the extremities of same, compression members connecting the lower ends of said levers with the lower ends of a second pair of vertical levers, each lever having a pivot point between its extremities, a second brake beam connected to each lever at fulcrum points between the extremities of same, tension members connecting the upper ends of said levers with the upper ends of a third pair of vertical levers, each of the latter being fulcrumed at points between their extremities to some convenient part of the truck, and compression members connecting the lower ends of said levers with a third beam.

3. In a brake rigging for six wheel trucks, the combination of a live lever having a pivot point between its extremities, a brake beam pivotally connected to said pivot point, a compression member connecting the lower end of said lever with the lower end of a second lever, the latter having a pivot point between its extremities, a second brake beam pivotally connected to said pivot point, a tension member connecting the upper end of said lever with the upper end of a third lever, the latter being fulcrumed at a point between its extremities, to some convenient part of the truck, and a compression member connecting the lower end of said lever with the lower end of a fourth lever, the latter having a pivot point between its extremities, to which a third brake beam is pivotally connected, and at its upper end a pivot point loosely mounted for pivotal and vertical movement of the levers.

4. In a brake rigging for six wheel trucks, the combination of a pair of vertically disposed live levers, one on each side of the truck, each lever having a pivot point between its extremities, a brake beam connected to each lever at fulcrum points between the extremities of same, compression members connecting the lower ends of said levers with the lower ends of a second pair of vertical levers, each lever having a pivot point between its extremities, a second brake beam connected to each lever at fulcrum points between the extremities of same, tension members connecting the upper ends of said levers with the upper ends of a third pair of vertical levers, each of the latter being fulcrumed at points between their extremities to some convenient part of the truck, compression members connecting the lower end of said levers with the lower end of a fourth pair of vertical levers, the latter having pivot points between their extremities to which a third brake beam is connected and mounted at their upper end for pivotal and vertical movement.

In testimony whereof, we have signed this specification in the presence of two subscribing witnesses.

JOHN C. WHITRIDGE.
GEORGE T. JOHNSON.

Witnesses:
GEORGE MATTHEW MURPHY,
GEORGE FIESER KRAUSS.

Copies of this patent may be obtained for five cents each, by addressing the "Commissioner of Patents, Washington, D. C."